(12) United States Patent
Spatscheck et al.

(10) Patent No.: US 7,620,807 B1
(45) Date of Patent: Nov. 17, 2009

(54) METHOD AND APPARATUS FOR AUTOMATICALLY CONSTRUCTING APPLICATION SIGNATURES

(75) Inventors: Oliver Spatscheck, Randolph, NJ (US);
Subhabrata Sen, New Providence, NJ (US); Dongmei Wang, Kearny, NJ (US)

(73) Assignee: AT&T Corp., New York, NY (US)

( * ) Notice: Subject to any disclaimer, the term of this patent is extended or adjusted under 35 U.S.C. 154(b) by 750 days.

(21) Appl. No.: 11/056,896

(22) Filed: Feb. 11, 2005

Related U.S. Application Data (60) Provisional application No. 60/543,725, filed on Feb. 11, 2004.

(51) Int. Cl.
*H04L 29/06* (2006.01)

(52) U.S. Cl. ..................... 713/152; 370/400

(58) Field of Classification Search .................... 706/26, 706/25, 16; 714/732; 704/257; 713/166, 713/200, 201, 152; 370/400
See application file for complete search history.

(56) References Cited

U.S. PATENT DOCUMENTS

| | | | | |
|---|---|---|---|---|
| 6,668,081 | B1* | 12/2003 | Ilan et al. | 382/187 |
| 6,681,357 | B2* | 1/2004 | Pendurkar | 714/732 |
| 7,082,420 | B2* | 7/2006 | Lo | 706/25 |
| 2003/0200189 | A1* | 10/2003 | Meng et al. | 706/26 |
| 2004/0111634 | A1* | 6/2004 | Ingman et al. | 713/201 |
| 2004/0111643 | A1* | 6/2004 | Farmer | 713/201 |
| 2004/0158738 | A1* | 8/2004 | Tanaka | 713/200 |
| 2004/0177266 | A1* | 9/2004 | Moyer et al. | 713/200 |
| 2004/0236946 | A1* | 11/2004 | Biggs et al. | 713/166 |
| 2004/0243824 | A1* | 12/2004 | Jones | 713/200 |
| 2006/0179016 | A1* | 8/2006 | Forman et al. | 706/16 |
| 2006/0179017 | A1* | 8/2006 | Forman et al. | 706/16 |
| 2007/0219798 | A1* | 9/2007 | Wang et al. | 704/257 |

OTHER PUBLICATIONS

Software architecture-based adaptation for Grid computing Shang-Wen Cheng ; Software architecture-based adaptation for Grid computing; Publication Date: 2002; IEEE; On pp. 389- 398.*

* cited by examiner

*Primary Examiner*—Kambiz Zand
*Assistant Examiner*—Monjour Rahim (57) ABSTRACT

The present invention relates to a method and system for the automated construction of application signatures. In one example, an approach for automatically constructing accurate signatures for individual applications, with minimal human involvement or application domain knowledge, is provided. Given a training data set containing the application traffic, the Automated Construction of Application Signatures (ACAS) system uses a combination of statistical, information theoretic and combinatorial optimization techniques, to derive application-layer signatures from the payload of packets, e.g., IP packets. Evaluations with a range of applications demonstrate that the derived signatures are very accurate and scale to identifying a large number of flows in real time on high-speed links.

20 Claims, 5 Drawing Sheets

METHOD AND APPARATUS FOR AUTOMATICALLY CONSTRUCTING APPLICATION SIGNATURES

CROSS-REFERENCE TO RELATED APPLICATION

This application claims benefit of U.S. provisional patent application Ser. No. 60/543,725, filed Feb. 11, 2004, which is herein incorporated by reference in its entirety.

BACKGROUND OF THE INVENTION

1. Field of the Invention

Embodiments of the present invention generally relate to a method for mapping traffic to applications in a network environment. More specifically, the present invention discloses an efficient method for constructing application signatures.

2. Description of the Related Art

An accurate mapping of traffic to applications is important for a broad range of network management and measurement tasks including traffic engineering, performance/failure monitoring, and security. In the Internet, applications have traditionally been identified using well-known default server network-port numbers in the TCP or UDP headers. However this approach has become increasingly inaccurate because many applications use non-default or ephemeral port numbers, or use well-known port numbers associated with other applications.

Alternatively, a more accurate technique entails utilizing specific application-level features in the traffic content to guide the identification. More specifically, this signature-based application classification approach parses packets for application-level information and tries to match the content of a TCP/UDP connection against common signatures found in the target application. However, existing approaches to application signature identification may involve a labor-intensive process combining information from available documentation, with information gleaned from analysis of packet-level traces to develop potential signatures, and using multiple iterations to improve the accuracy and computation overheads. Such a painstaking manual approach will scale poorly if applied to the growing range of diverse Internet applications.

Therefore, there is a need in the art for a method and apparatus for automatically constructing application signatures.

SUMMARY OF THE INVENTION

In one embodiment, a method and system for the automated construction of application signatures is described. More specifically, an approach for automatically constructing accurate signatures for individual applications, with minimal human involvement or application domain knowledge, is provided. Given a training data set containing the application traffic, the Automated Construction of Application Signatures (ACAS) system utilizes a combination of statistical, information theoretic and combinatorial optimization techniques, to derive application-layer signatures from the payload of packets, e.g., IP packets. Evaluations with a range of applications demonstrate that the derived signatures are very accurate and scale to identifying a large number of flows in real time on high-speed links.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
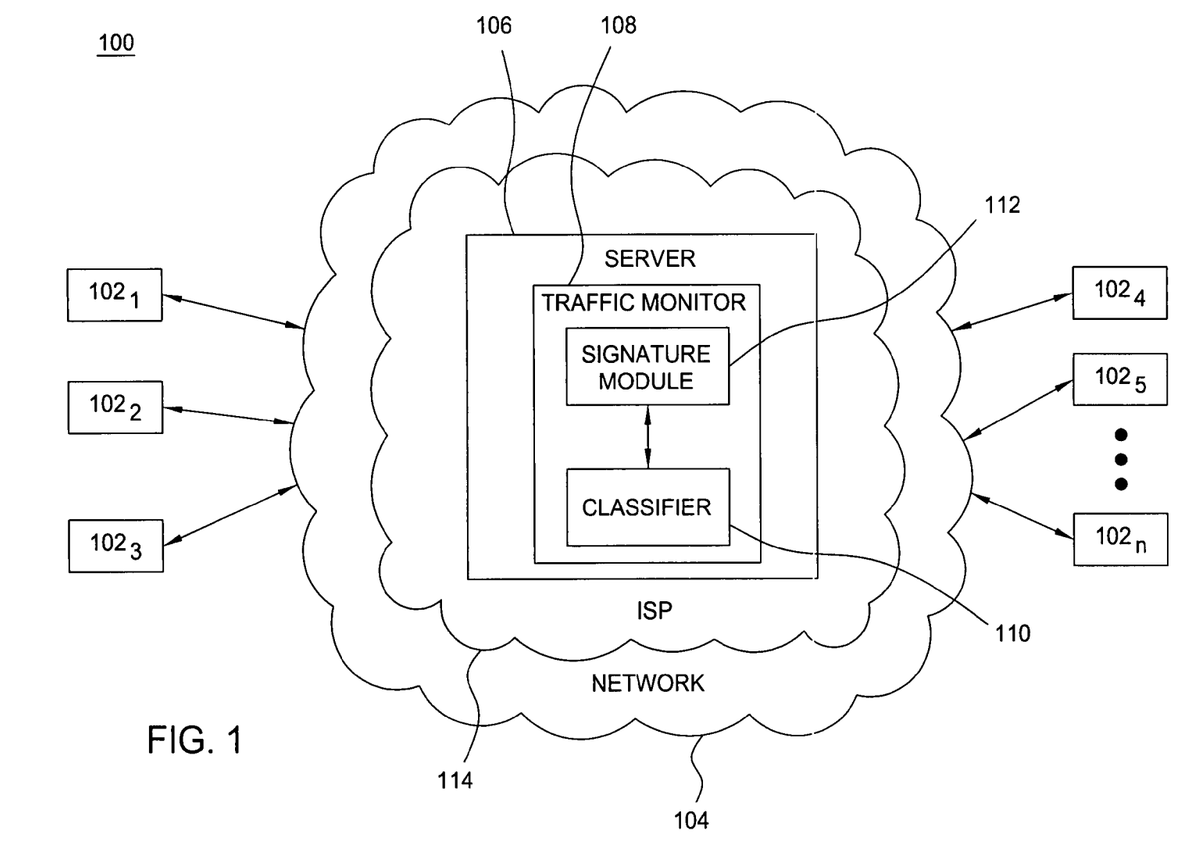
FIG. 1 is a block diagram depicting an exemplary embodiment of a communications system in accordance with this invention.

FIG. 1 depicts a computer network 100 in which the embodiments of the present invention may be utilized. This figure only portrays one variation of the myriad of possible network configurations. For example, FIG. 1 could have depicted numerous servers 106. For simplicity and clarity, only one server 106 is depicted and described below. The invention, as shall be discussed below, is a method and apparatus for automatically constructing application signatures.

The computer network 100 comprises a plurality of client computers, $102_1, 102_2 \ldots 102_n$, that are connected to one another through a conventional data communications network 104 (e.g., the Internet, a wide area network, or a local area network). A server 106, which belongs to an Internet service provider 114, is connected to the communication network 104 to supply application and data services as well as other resource services to the clients $102_1, 102_2 \ldots 102_n$.

The server 106 comprises a traffic flow monitor module 108 that is responsible for detecting application features within flows that pass through the service area of the ISP 114. The traffic flow monitor module 108 similarly contains a signature creation module 112 and classifier module 110. The signature creation module 112 is a software application that is responsible for creating the application signatures of the present invention. The application signatures embody the set of conditions defined over a set of features in the application traffic (e.g., flow). These signatures enable the classifier module 110 to detect and mark the relevant application traffic that matches the conditions outlined in the signature associated with a particular application. In one embodiment, the signature creation module 112 and classifier module 110 are located on different computers (i.e., it is not necessary for these modules to be located in the same device).

In one embodiment, the requirements for a signature composition method requires that the resultant signatures (i) are accurate, (ii) have low evaluation overheads to make it practicable to use the corresponding classifier online for real-time classification on high speed links, and (iii) allow the classifier to identify the application early in the connection. Finally, the method should have wide applicability and be capable of developing accurate, efficient signatures for a range of different applications.

The present invention entails a novel signature construction method that requires minimal prior knowledge of an application or its protocol specification. Given a training data set containing the application traffic, it automatically identifies discriminating features and composes them into a signature. The technique uses a novel combination of ideas from information theory, statistics, logic theory, and combinatorial optimization.

To address the early detection requirement, the method of the present invention focuses on deriving signatures from the first packet with a non-zero payload in a given direction of an application connection. The corresponding classifiers will also be packet-based, requiring minimal per-connection state which is desirable. The resulting classifiers have the added advantage that they do not require to reassemble application-level data stream from the TCP/UDP packets, which are difficult to achieve in the middle of the network. The above constraints contribute to keeping real-time evaluation overheads (e.g., space and computation overhead) low.

One aspect of the present invention is to identify application signatures automatically from a training data set and use those signatures to build a classifier which identifies application and non-application flows accurately and in real time. A flow may be defined as a unidirectional sequence of packets between two hosts which share the same source and destination IP address, protocol, and port numbers if applicable. The duration of a flow is limited either by the underlying protocol such as TCP connection establishment and tear-down or by one or more timeouts.

The accuracy of the signature is a cost function over the signature's capability to classify a flow. More specifically, if a non-application flow is identified as an application flow according to the constructed signatures, it may be a false positive misclassification and denote "FP" as the total number of false positive misclassifications. Similarly, if an application flow is identified as non-application flow according to the constructed signatures, this may be designated as a false negative misclassification and "FN" as the total number of false negative misclassifications. Likewise, true positive "TP" may be defined to be the total number of application flows that is correctly identified by the constructed signature.

The precise cost function is dependent on the specific requirements of the application using the classification. Different applications may have different tolerable inaccuracy (FP and FN) thresholds. While most applications desire both low FP and low FN, one of the two factors may be more important depending on the nature of the application. For instance, if preferential service is needed to be provided to business critical applications, it is more important to identify all the flows for the target application. Consequently, the reduction of FN is of paramount concern, even at the expense of an increase in FP.

Accordingly, the automatic signature construction problem may be formulated. Given a training data set, which consists of an application data set and a non-application data set, an application signature may be automatically extracted such that a specified cost function over the FN and FP is minimized. Lastly, any mapping technique for identifying traffic online on high speed links inside the network should adhere to certain requirements. Some of these requirements may include:

Accuracy: When the constructed signatures apply to other test data set, they should maintain small values of the cost function over FN and FP.

Early Detection The constructed signatures should be such that the corresponding classifier is able to identify the application after examining at most a few packets in the connection. Early detection capability is important, e.g. to provide accurate traffic statistics in real time. For example, this is particularly relevant for performance monitoring for long lived flows such as live streaming events.

Scalability: The constructed signatures will be implemented in online filters/classifiers to monitor the application traffic at line speed. Thus, the constructed signatures should be computationally cheap so that those online classifiers are able to process large traffic volumes. For the same reason, the classifier preferably should have low per flow state requirements.

Robustness: The signature construction approach should be able to handle various types of features, including bits, bytes, words, and strings. And it also should be easily extended to other types of features. This is because an application may evolve and change the signature patterns.

Versatility: The algorithm should be able to handle a range of cost functions, and be capable of developing accurate, efficient signatures for a range of different applications.

The details of the Automated Signature Construction approach of the present invention will now be addressed. The overall approach of the signature detection scheme uses concepts from the classical training and validation process used in statistical machine learning. In this process a model is trained on preclassified data (training data set) which yields a signature. The signature is then validated by testing it on a separate preclassified data set (e.g., validation data set). These two steps are necessary to assure that the signature is not only capable of classifying the training data set, but also able to classify other data sets. A signature which can only classify the training data set is called an overfitting signature. For example, an overfitting signature for Hypertext Transfer Protocol (HTTP) traffic may be derived from a training data set in order to store all URLs found in the training data set. The signature would effectively work with the training data set but not at all on HTTP traffic which contains different URLs. Typically, overfitting occurs if either the training data set is too small or if the training method allows the signature to contain an excessive amount of information.

As a means to improve the confidence in the signature further, this basic approach is typically extended to include multi-fold training and validation if there is a sufficient amount of data available and the computational time is reasonable. Multi-fold training increases the confidence that the model training is independent from the training data set. Similarly, multi-fold validation demonstrates the applicability of the derived signature to classify random data sets.

Figure 2:
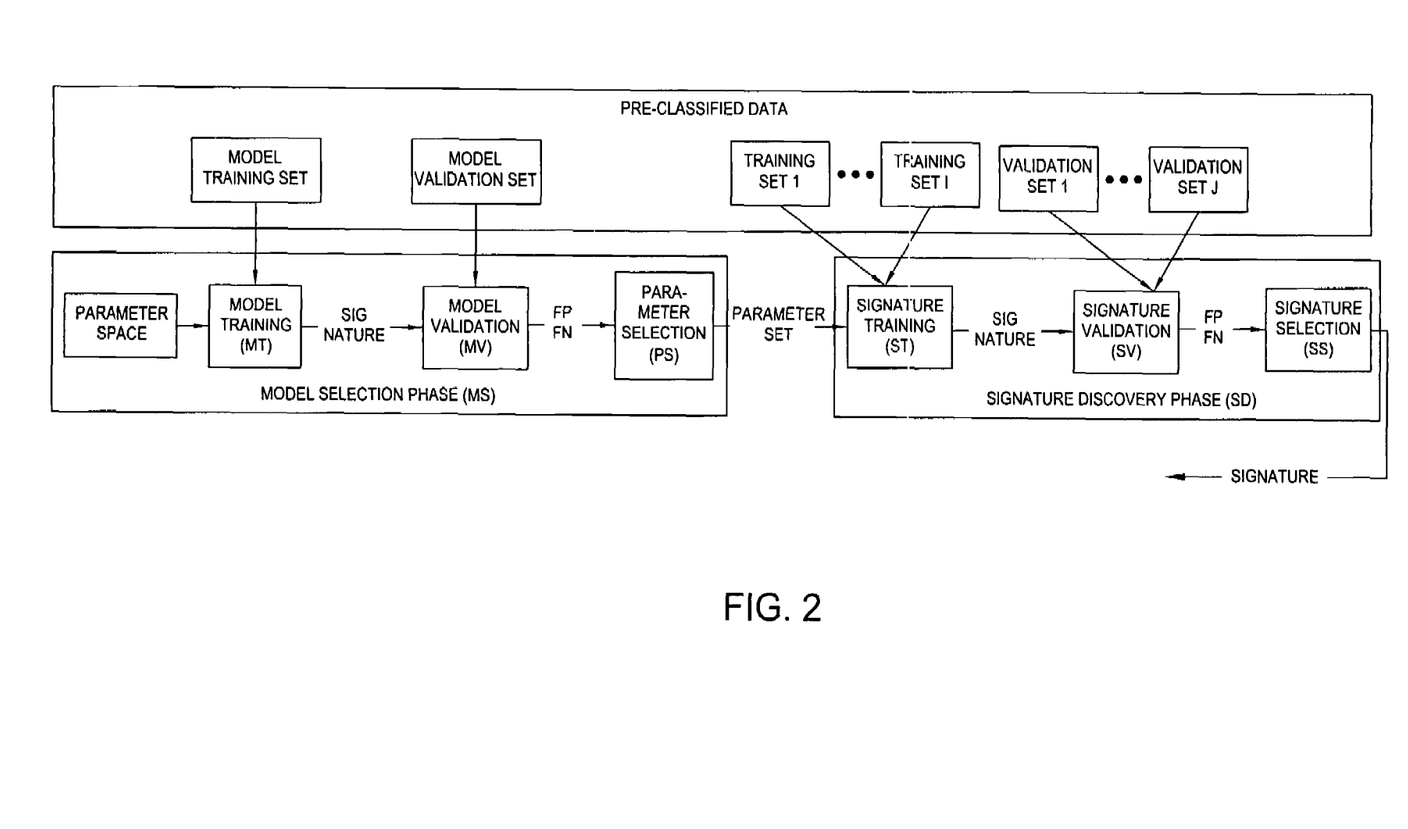
FIG. 2 is a flow diagram depicting an exemplary overview of the automated signature construction approach in accordance with this invention.

FIG. 2 depicts a flow chart of the automated signature construction approach. It consists of two phases: the Model Selection Phase (MS) and the Signature Discovery Phase (SD). The input of the overall procedure includes: 1+I+J preclassified data sets: one training and one validation data set in the MS phase, I training and J validation data sets in the SD phase, and a cost function. The motivation for using a single training and validation approach in MS phase as well as utilizing one parameter combination in the SD phase is attributed to the computational complexity of building a signature. Lastly, the final output is an auto-constructed signature, which minimizes the cost.

Figure 3:
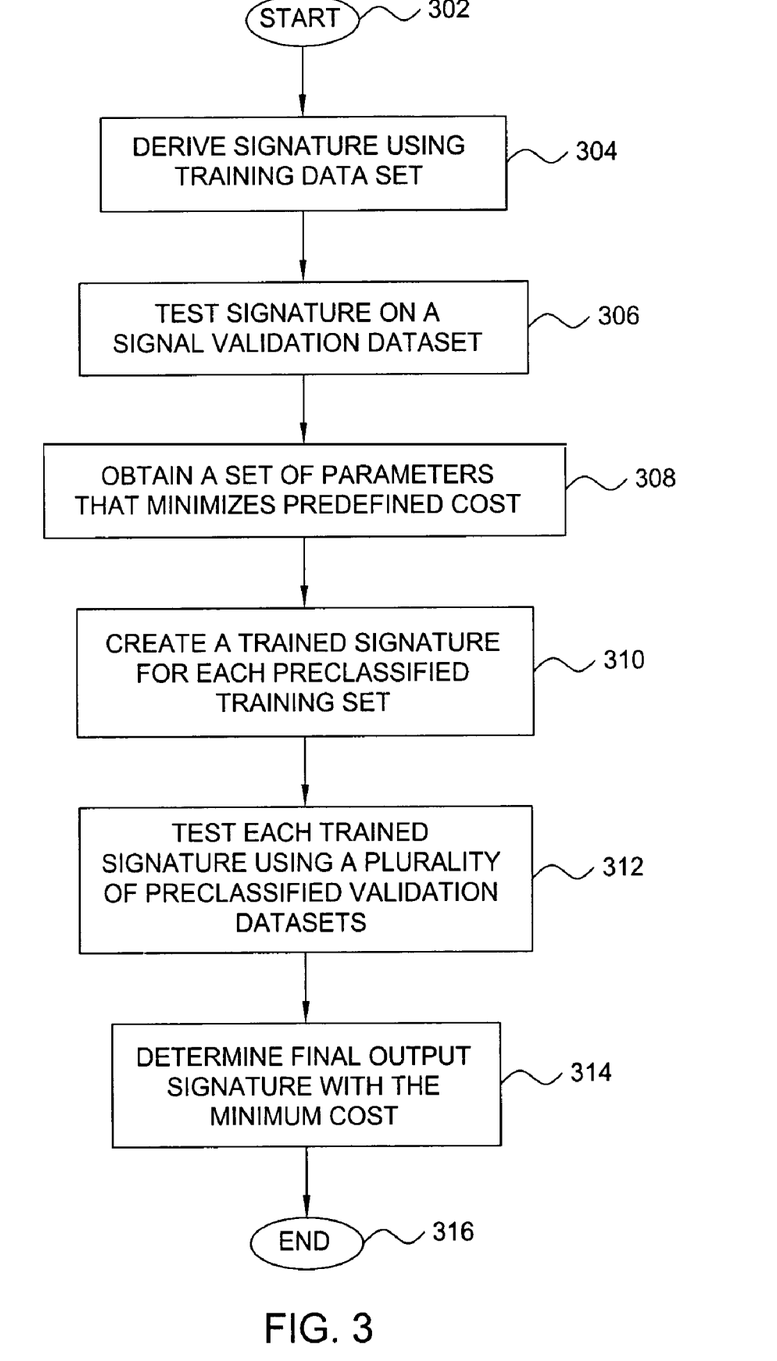
FIG. 3 is a flow diagram depicting an exemplary embodiment of a method for constructing application signatures in accordance with this invention.

There are multiple parameters involved in the signature construction method detailed in method 300. Consequently, the corresponding parameter values must be determined prior to constructing the signature for a specific application. The MS phase achieves this by using a single training and validation step.

FIG. 3 is a flow diagram depicting an exemplary embodiment of a method 300 for automatically constructing an application signature in accordance with the invention. Aspects of the method 300 may be understood with reference to FIGS. 1 and 2. The method 300 begins at step 302. Since there are multiple parameters involved in the signature construction method defined in method 300, the corresponding parameter values must first be determined (steps 304-308) before the final output signature is obtained. In one embodiment, the determination of the corresponding parameter values is referred to as the "model selection (MS) phase". This phase is initiated at step 304, where a signature is derived using a training data set. More specifically, this step 304 is labeled as model training (MT) and by utilizing the method of the present invention, signatures are derived using pre-classified data. Step 304 sweeps through the parameter space (e.g., takes a representative set of parameters as input) and builds a signature as an output for each set of parameters.

At step 306, the signature is tested with a single validation data set. In one embodiment, step 306 is referred to as the model validation (MV). More specifically, step 306 takes the signatures generated in step 304 as input, and tests them individually on a single preclassified validation data set yielding a pair of FP and FN as output.

The method 300 continues to step 308, where a set of parameters that minimizes the predefined cost is obtained. In one embodiment, step 308 is labeled as the parameter selection (PS) and takes the input parameters in MT with the associated output FP and FN in MV as input, and subsequently searches for a set of parameters that minimizes the predefined cost, which is a function of FP and FN.

After the MS phase, the signature is ready to be constructed for a given application. This is achieved through the "signature discovery (SD) phase." In one embodiment, the SD phase takes the selected set of parameters from the MS phase as input, and uses multi-fold training and validation process yielding the final signature. The SD phase is comprised of steps 310-314 detailed below.

At step 310, a trained signature is created for each preclassified training set. This signature training (ST) step takes the selected set of parameters from the MS phase as the input value for the parameters, and trains on each of the I preclassified training data sets and yields a signature for each training set, respectively. The method for constructing the signature is similar to step 304 in the MS phase, and is addressed in detail below.

At step 312, each of the trained signatures is tested using a plurality of preclassified validation data sets. In one embodiment, step 312 is referred to as the signature validation (SV) step and details the testing of the I signatures from step 310 on each of the J preclassified validation data sets. Thus, a set of FP and FN values per test data set are generated for a total of J sets of FP and FN values for each classifier.

The method 300 proceeds to step 314, where the final output signature is determined. In one embodiment, step 314 is labeled as the signature selection (SS) step and takes the I classifiers and associated J set of FP and FN values per signature as input. With this information, the signature with the minimum cost (i.e., FP and FN) among the I candidate signatures is designated as the final output signature. The method 300 then ends at step 316.

Figure 4:
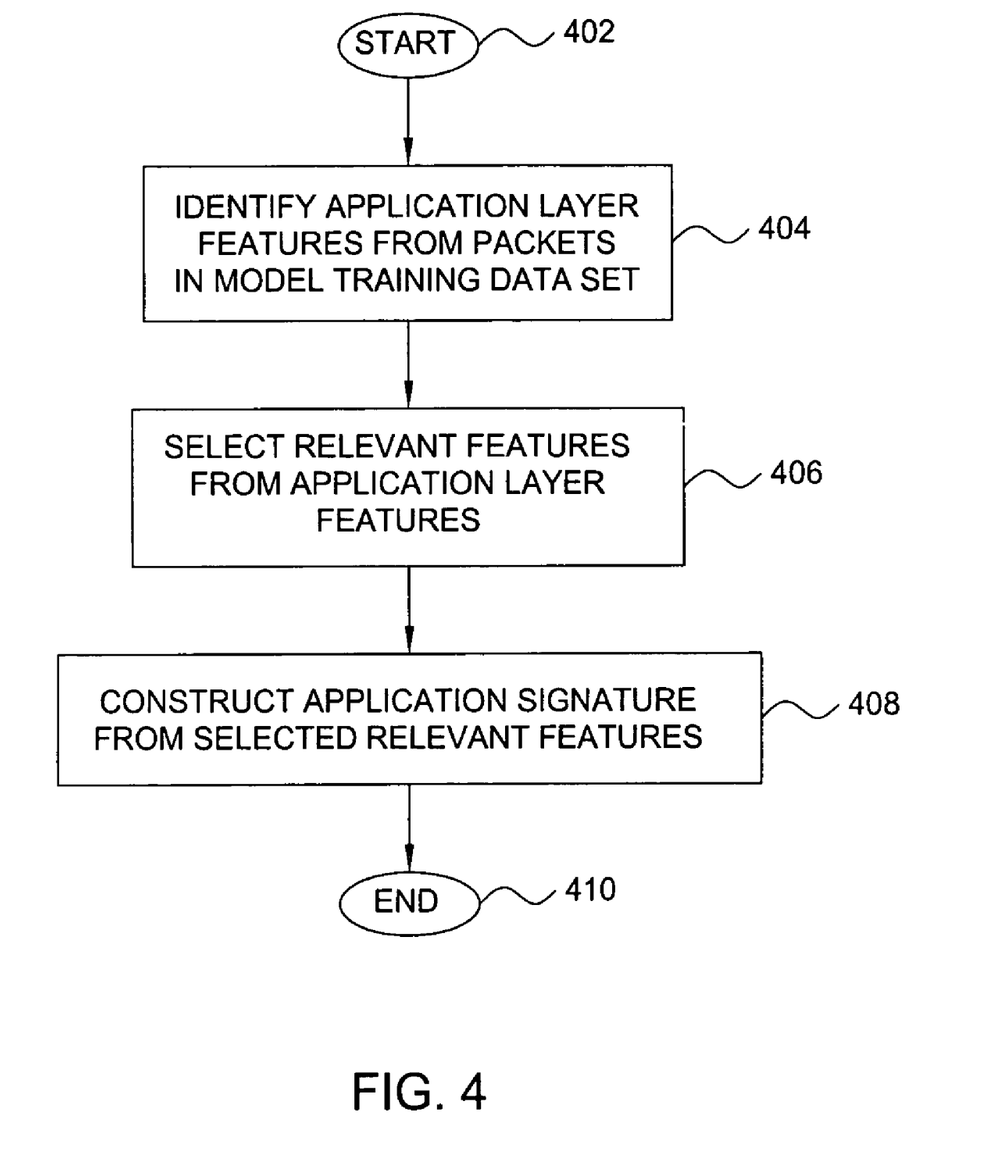
FIG. 4 is a flow diagram depicting an exemplary embodiment of a training method in accordance with this invention.

FIG. 4 is a flow diagram depicting an exemplary embodiment of a method 400 detailing the training method in accordance with the invention. Aspects of the method 400 may be understood with reference to FIGS. 1 and 2. The method 400 begins at step 402. Notably, method 400 depicts one embodiment of the detailed methods used in both MT and ST steps in method 200. Each training step includes three substeps: feature extraction, feature selection, and feature combination. The method for each individual substep will be described in turn.

At step 404, the application layer features are identified from packets in the model training data set. More specifically, one aspect of this feature extraction step is to identify potential application layer features from packets in the input training data set. In one embodiment, a feature corresponds to a pattern of consecutive bit values comprising beginning and ending delimiters that occur at some fixed or variable offset in the payload part of the packet. The main problem involved with identifying all of the possible features in a text involves parsing the text to identify the feature boundaries. Key challenges in solving the general problem may include: (i) the delimiters are not known apriori and need to be discovered, and (ii) the space of all possible features may be extremely large.

However, the present invention may exploit characteristics of the problem domain to identify features and handle the feature space explosion problem. First, there is a primary interest in features that can serve as good discriminators for the application's protocol, since these will be the most useful in developing accurate application-level signatures. The application protocol headers are likely to be natural sources of such features. Even though prior knowledge of a particular application cannot be assumed, it is reasonable to believe that an application header will either use bit or ASCII encoding. As discussed below, these types of features work well for the protocols tested. Second, most conventional protocols convey some header information in the application-level data stream near the beginning of a connection (e.g., application-level handshake information). Third, distinct from random text, typical headers often possess some specific characteristics which can be exploited to identify header-based features. In order to avoid the feature space explosion issue, several measures to reduce the feature searching space may be taken and are discussed below.

1. Packets containing application header information

Since there is an interest in features that may serve as good discriminators for an application, and such features are mostly presented in the application headers, the focus on packets carrying the necessary header information is of particular interest. Notably, most protocols convey some header information at the beginning of a connection (e.g., application-level handshake information) and there is a number of applications that require an early identification capability. Thus, the classifier should be able to identify the application very early in a connection.

2. Focus on a few specific feature types

Application headers often possess some specific characteristics which can be exploited to identify header-based features.

Specifically, the method implementation of the present invention concentrates on three feature types commonly found in protocol headers:

Bit A bit feature is a fixed offset, which is frequently set or unset, among the application packets in the training data set. A bit is considered frequently set/unset if it has the same value in more than a given percentage of the application packets. This given percentage is a parameter called the Bit Feature Threshold B.

Word A word feature is a variable offset character sequence terminated by non-printable or whitespace characters or by the end of the payload. A particular payload can have multiple word features. By defining a word to be surrounded by non-printable or whitespace characters, the number of word combinations can be reduced significantly. For example, this definition avoids considering the word AB as three words A, B and AB but only one word AB.

HTTP A Hypertext Transfer Protocol (HTTP) feature is defined as a string terminated by either a single newline character or end of payload. The HTTP feature is terminated if a non-printable character is observed. This handles the case of broken HTTP headers. The HTTP feature only presents in the packets with HTTP-like headers. The method of the present invention decides if a particular packet might contain HTTP headers by checking if the payload stars with HTTP or an HTTP command such as GET, PUT, etc.

The method of the present invention can be easily extended to include other types of features, however the choices of features have covered a large collection of applications, including protocols with binary headers (Bit feature), ASCII headers (Word feature) and HTTP headers (HTTP feature) protocol based applications.

3. Prune random features during feature extraction

Even with the focused extraction outlined above, for reasonable sized training data sets the number of potential word and HTTP features may be extremely large. Notably, features that occur rarely are unlikely to be good discriminators and the number of such infrequent features can prove to be very large. As a result, infrequent features are pruned in a window-based streaming fashion to limit the memory requirement while processing the training data. Specifically, all features that have not been seen at least $p_F$ times are removed after processing $q_F$ features where $p_F$ and $q_F$ are two tunable parameters in the method. In particular, a data set with a total of N packets of which each packet contains on average F features, the pruning will eliminate only features which do not occur more than $((N*F)/q^F)*(p_F-1)$.

In summary, the feature extraction method takes the training data set as input, extracts the distinct individual bits, words and HTTP (if a packet has HTTP header) features from the packets, and counts the number of occurrences of each feature among application and non-application packets separately. The final output of the feature extraction method is the set of distinct features with associated occurrence frequencies. Thus, even if a pattern appears multiple times in a packet, it will only be counted once.

Returning to method 400, the process continues to step 406 where relevant features are selected from application layer features. In one embodiment, step 406 is referred to as the feature selection step. Although step 404 already eliminates a large number of infrequent features through the pruning process, the number of extracted features may still be significant. In addition, many of the extracted features may not be good discriminators for the application. A feature occurring frequently in both application and non-application packets cannot serve the purpose of distinguishing the application. Therefore, there is a need to identify the "good" discriminators among the candidate features.

Consequently, the concept of mutual information (MI) is adopted from information theory in order to identify "good" features. The mutual information provides a measure of how closely each feature pattern is related to the application. Intuitively, the higher the mutual information, the better the absence or presence of a feature pattern may determine whether a packet belongs to the application. The input to the signature construction method is a training data set composed of two clearly demarcated subclasses: The first, denoted S contains flows and packets belonging to the application and the second, denoted $\bar{S}$ contains a collection of flows and packets that belong to other applications. For each candidate feature $F_i$, consider the binary random variable $X_i$. For a given data packet, $X_i=1$ if the feature is present in the packet, and $X_i=0$. Let random variable C correspond to the class variable. For a given packet, C=0 if the packet belongs to the application class otherwise it is C=1. The mutual information (MI) for $F_i$ and C is given by:

$$MI(X_i; S) = \sum_{x \in \{0,1\}, c \in \{0,1\}} P(X_i = x, C = c) \times \log \frac{P(X_i = x, C = c)}{P(X_i = x)P(C = c)}$$

The feature selection method takes the features with associated occurrence frequency values as input, computes the MI for each feature according to equation (1), then ranks the importance of the features based on MI, and selects the top N (a tunable parameter) features with the highest MI as the output.

Step 406 computes two occurrence frequencies for each candidate feature $F_i$. Namely, the number of occurrences of the feature in the set S and $\bar{S}$ denoted by $c(F_i,S)$ and $c(F_i,\bar{S})$, respectively. These can be used to compute empirical estimates of the probabilities $P(X_i=x,C=c)$ and $P(X_i=x)$. The prior class probabilities $P(C=c), c \in \{0,1\}$ may be estimated by computing the empirical probabilities from the training data set or be based on additional prior information. In one embodiment, the method uses a class probability of 0.5 (Note: The class probability of 0.5 is just one possibility, as the present invention may utilize other probability values). The rational for this design choice is to derive a positive signature for a given application. This means features which identify the application and not the non-application traffic are desired. Since the typical application desired to be classified only represents a small fraction of the overall traffic, setting the prior probe in proportion to the traffic would discriminate against features of application traffic. Thus, more non-application traffic features would be selected, which is one aspect of the present invention.

At step 408, the application signature is constructed from selected relevant features. In one embodiment, step 408 is referred to as the feature combination step and specifically involves constructing an application signature from the selected individual features for the positive identification of application packets. Let $B_i$, ($1 \leq i \leq N$) be a Boolean expression that evaluates to true if the feature $F_i$ is present in a packet, and false otherwise. $\bar{B}_i$ is the complement of $B_i$. Then an application signature can be expressed as a Boolean expression A consisting of some logical combination of the different $B_i$s. An incoming packet is marked as belonging to the application class if A evaluates to "True" for the packet.

Two notable challenges are presented here. The first being the size of the space of all Boolean expressions. Even for moderate values of N, the number of distinct logical expressions combining the $B_i$s is $2^{2^N}$. Unless N is extremely small, a search through the space of expressions would not be feasible. As detailed below, a set of variables $\{B_1, \ldots B_N\}$ is called mutually exclusive if they evaluate to true for mutually disjoint sets of packets. An additional difficulty is that the $B_i$s' may not be mutually exclusive. Notably, some features are strongly correlated and often appear together. For example, the word GET and HTTP appear frequently together in a HTTP request. Similarly, some features may be mutually exclusive. For example, the words GET and POST both appear at the beginning of some of the HTTP packets, but typically do not appear in the same HTTP packet.

Likewise, Boolean expressions constructed from the $B_i$s' may not always be mutually exclusive. The implication is that a single packet may result in a match for multiple Boolean expressions. The earlier feature extraction phase (step 304) considers each feature as an individual signature for the application and computes the individual FP and FN values for the training set for these signatures. However, without additional passes over the training data, it is not possible to compute the accuracy statistics (FP, FN) of larger expressions using the FP and FN values of component subexpressions that are not mutually exclusive. The feature combination problem may be formulated as the following accuracy cost optimization problem:

Given an acceptable false positive value K, a training data set which consists of an application data set and a non-application data set, and a set of selected features $F_1, \ldots, F_N$, construct an application signature such that the FN is minimized and FP<K for the training data set.

The method of the present invention combines the features into a signature through a two-step process. First, the individual features are combined into mutually exclusive minterms (logical product expressions) of all Bis and their complements through logical "AND" operations. Second, combine a subset of these minterms into a signature through logical "OR" operations. The resultant signature is in the form of a canonical "sum of products" combination of the individual $B_i$'s.

This approach has the following benefit that all of the minterms are mutually exclusive, i.e., they accept mutually disjoint sets of packets. Even though an additional pass needs to be made over the training data to compute the different accuracy measures (FP, TP) of the minterms, the subsequent "OR" combination step does not require any additional passes over the data. In particular when searching through the space of possible subsets of minterms for the sum-of-products solution, the accuracy numbers can be derived directly from the corresponding values for the selected minterms. The mutual exclusive property of the minterms ensures that the FP and TP of an "OR" combination are just the sums of the corresponding minterm values. The second benefit is that the above additive property is a key desirable property as it enables the search to be modeled as a combinatorial optimization problem that can be solved in polynomial time as shown below.

A straightforward way to construct the minterms is to consider all the possible combinations of the individual features. Take three features A, B and C as an example, there are totally 8 possible combinations: A&!B&!C, A&!B&C, A&B&!C, A&B&C, !A&!B&!C, !A&!B&C, !A&B&!C and !A&B&C, where X and !X represent the feature X is present and absent in an application packet, respectively. However, this approach has a scalability problem. With N features, the number of "AND" combinations is $2^N$, which grows exponentially as N increases. Therefore, the present invention offers an alternative approach, which constructs the minterms effectively without presenting space problems.

Although the number of potential "AND" combinations is significantly large, the number of combinations, which really can be used as discriminators, will be much smaller and bounded by the size of the training data set. The basic criteria for a minterm to serve as a discriminator is that it should appear in a number of the training packets. Secondly, a minterm should satisfy more stringent conditions to be classified as a good discriminator (e.g., appears in training data set with at least certain frequency and appears more frequently in S than in $\overline{S}$).

The method takes the selected N features, denoted as $F_i$, ($1 \leq i \leq N$), and training data set as input and associates each packet in the training set with a minterm expression $x_1 \& x_2 \& \ldots \& x_n$ to construct the minterms. The minterm is determined by examining whether each of the features $F_i$ presents in the packet. If $F_i$ presents, $x_i = F_i$ in the minterm, otherwise $x_i = !F_i$. Note that no packet should match more than one of such minterms, therefore, the minterms constructed via such a process are mutually exclusive. Only minterms which are actually present in the training set are tracked. The method of the present invention also computes the statistics (TP and FP) on the signatures corresponding to each distinct minterm. Then, the method filters out minterms deemed to be inefficient discriminators as described below.

The same pruning scheme for feature extraction is utilized to filter out the minterms, which occur less than $p_M$ times after processing $q_M$ minterms. The impact of the pruning step is that it may slightly increase the FN count for the final sum of products filter. By properly selecting the pruning parameters, it is possible to both keep the increase small while still achieving effective pruning. Similarly, two types of minterm expressions are discarded from the resultant minterm set. The first is minterms that have TP=0 because such terms will only bring in more FP errors without contributing to the FN reduction. The second is minterms for which TP<FC*FP, where FC (Filter Coefficient) is an input parameter. By selecting FC>1, the contributions to the FN reduction is ensured to be greater than FP error brought in by a minterm. The final output of the "AND" combination method is a set M of $|M| \leq 2^N$ minterms and their corresponding TPs and FPs.

The mutually exclusive minterms are now ready to be combined into a sum of the minterms, which would be the final constructed signature. The problem of computing the sum of products may be formulated as a subset sum selection problem. For instance, the $i^{th}$ minterms selected above may be denoted as $M_i$ with $1 \leq i \leq m$ and the associated accuracy statistics as $TP_i$ and $FP_i$. Let Q be some subset of these minterms, and R denote the "OR" combination of the elements of Q, and $TP_R$ and $FP_R$ be its accuracy statistics. The feature combination objective then reduces to determining a subset Q of minterms that maximizes $TP_R$, keeping $FP_R \leq K$. In general, the space of possible distinct subsets can still be large ($2^{|M|}$). However, the fact that the minterms are mutually exclusive may be exploited to formulate the above problem as:

Select a subset M' of the minterms in M such that $\Sigma_{i \in M'} TP_i x_i$ is maximized and $\Sigma_{i \in M'} \{FP_i x_i\} \leq K$, where $x_i = 1$ if minterm i is selected for M', otherwise $x_i = 0$. This is a classical 0-1 knapsack problem which is known to be NP-hard in general. However, in this instance, it may be solved using Dynamic programming in quadratic time $O(|M| \times K)$, where K is bounded by the size of the training data set.

To summarize, the method for signature construction described above has a number of tunable parameters. The method is used twice: once in the Model Training (MT) step and once in the Signature Training (ST) step. In the MT step (step 204) the approach sweeps the range of values for each parameter. For each parameter combination the training method yields a particular sum of products combination of features as a signature. Each signature in term is applied to a validation set yielding FP and FN values. The last step in the MS phase (step 308) is to search for the input parameter combination that minimizes the cost function over FP and FN computed in the second step.

This parameter combination is the input to the ST step (step 410). In this step the training method is used on multiple training data sets yielding multiple signatures. Each of these signatures is then verified multiple times and the best signature (with the lowest cost) is chosen as the signature for the online classification.

Figure 5:
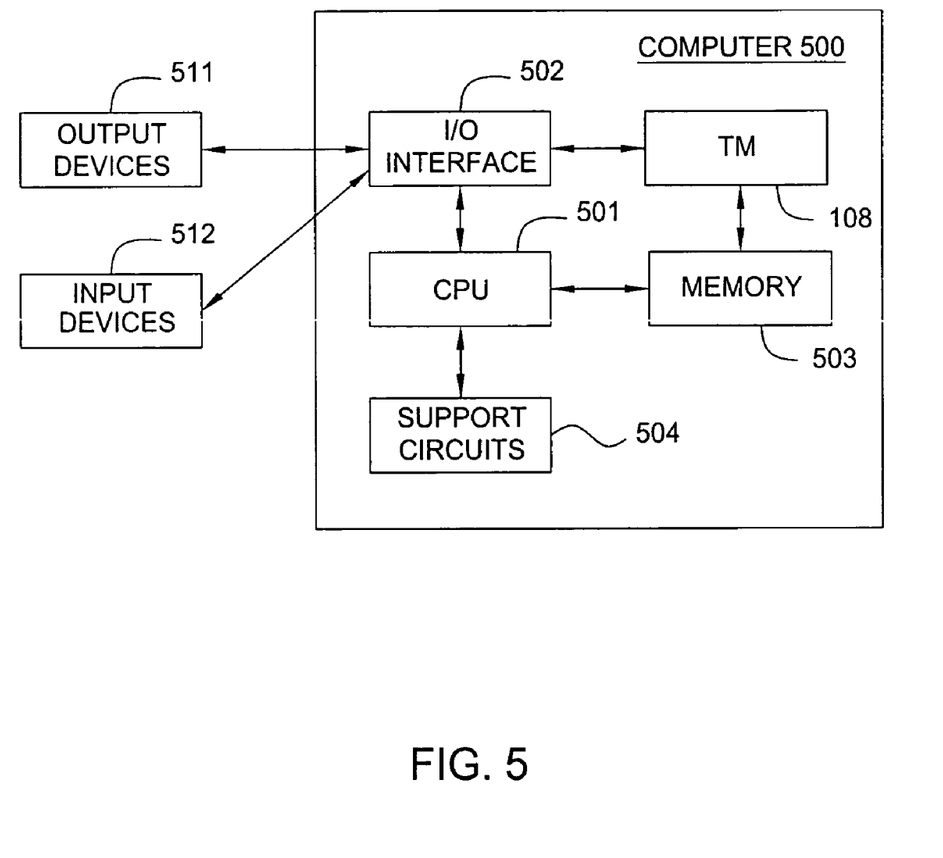
FIG. 5 is a block diagram depicting an exemplary embodiment of a computer suitable for implementing the processes and methods described herein.

FIG. 5 is a block diagram depicting an exemplary embodiment of a computer 500 suitable for implementing the processes and methods described herein. For example, the computer 500 may be the server 106 of FIG. 1. The computer 500 includes a central processing unit (CPU) 501, a memory 503, various support circuits 505, an I/O interface 502, and the traffic flow monitor module 108 (depicted in FIG. 1). The CPU 501 may be any type of microprocessor known in the art. The support circuits 504 for the CPU 501 include conventional cache, power supplies, clock circuits, data registers, I/O interfaces, and the like. The I/O interface 502 may be directly coupled to the memory 503 or coupled through the CPU 501. The I/O interface 502 may be coupled to various input devices 512 and output devices 511, such as a conventional keyboard, mouse, printer, display, and the like.

The memory 503 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

It should be understood that the traffic flow monitoring module 108 can be implemented as physical devices that are coupled to the CPU 501 through a communication channel. Alternatively, the traffic flow monitoring module 108 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 504 of the computer. As such, the traffic flow monitoring module 108 (including associated data structures, e.g., model training data set, single validation data set, cost minimizing parameter data, and the like) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for generating a final signature for an application, comprising:

deriving an initial application signature using a model training data set;

testing said initial application signature with a single validation data set;

obtaining at least one cost minimizing parameter;

creating a plurality of trained application signatures using both said at least one cost minimizing parameter and a plurality of preclassified training data sets;

testing each of said plurality of trained application signatures using a plurality of preclassified validation data sets; and determining said final signature from said plurality of trained application signatures.

2. The method of claim 1, wherein said deriving comprises:

identifying application layer features from data packets in said model training data set;

selecting relevant features from said application layer features; and constructing said initial application signature from said selected relevant features.

3. The method of claim 2, wherein said selecting is conducted via mutual information.

4. The method of claim 2, wherein said application layer features comprise at least one of: a bit feature, a word feature, or a Hypertext Transfer Protocol (HTTP) feature.

5. The method of claim 1, wherein said creating comprises:

identifying application layer features from data packets in each of said plurality of preclassified training data sets;

selecting relevant features from said application layer features; and constructing one of said plurality of trained application signatures from said selected relevant features.

6. The method of claim 4, wherein said selecting is conducted via mutual information.

7. The method of claim 5, wherein said application layer features comprise at least one of: a bit feature, a word feature, or a Hypertext Transfer Protocol (HTTP) feature.

8. The method of claim 1, wherein said final signature comprises one of said plurality of trained application signatures that minimizes a cost.

9. A system for generating a final signature for an application, comprising:

means for deriving an initial application signature using a model training data set;

means for testing said initial application signature with a single validation data set;

means for obtaining at least one cost minimizing parameter;

means for creating a plurality of trained application signatures using both said at least one cost minimizing parameter and a plurality of preclassified training data sets;

means for testing each of said plurality of trained application signatures using a plurality of preclassified validation data sets; and means for determining said final signature from said plurality of trained application signatures.

10. The system of claim 9, wherein said means for deriving comprises:
   means for identifying application layer features from data packets in said model training data set;
   means for selecting relevant features from said application layer features; and
   means for constructing said initial application signature from said selected relevant features.

11. The system of claim 10, wherein said means for selecting is conducted via mutual information.

12. The system of claim 9, wherein said means for creating comprises:
   means for identifying application layer features from data packets in each of said plurality of preclassified training data sets;
   means for selecting relevant features from said application layer features; and
   means for constructing one of said plurality of trained application signatures from said selected relevant features.

13. The system of claim 12, wherein said means for selecting is conducted via mutual information.

14. The system of claim 9, wherein said final signature comprises one of said plurality of trained application signatures that minimizes a cost.

15. A computer readable medium having stored thereon instruction that, when executed by a processor, causing the processor to perform a method for generating a final signature using machine learning, comprising:
   deriving an initial application signature using a model training data set;
   testing said initial application signature with a single validation data set;
   obtaining at least one cost minimizing parameter;
   creating a plurality of trained application signatures using both said at least one cost minimizing parameter and a plurality of preclassified training data sets;
   testing each of said plurality of trained application signatures using a plurality of preclassified validation data sets; and
   determining said final signature from said plurality of trained application signatures.

16. The computer readable medium of claim 15, wherein said deriving comprises:
   identifying application layer features from data packets in said model training data set;
   selecting relevant features from said application layer features; and
   constructing said initial application signature from said selected relevant features.

17. The computer readable medium of claim 16, wherein said selecting is conducted via mutual information.

18. The computer readable medium of claim 15, wherein said creating step comprises:
   identifying application layer features from data packets in each of said plurality of preclassified training data sets;
   selecting relevant features from said application layer features; and
   constructing one of said plurality of trained application signatures from said selected relevant features.

19. The computer readable medium of claim 18, wherein said selecting is conducted via mutual information.

20. The computer readable medium of claim 15, wherein said final signature comprises one of said plurality of trained application signatures that minimizes a cost.

* * * * *